United States Patent
Su et al.

(10) Patent No.: US 11,749,828 B2
(45) Date of Patent: Sep. 5, 2023

(54) WOUND CELL AND BATTERY USING THE SAME

(71) Applicant: Ningde Amperex Technology Limited, Ningde (CN)

(72) Inventors: Xinru Su, Ningde (CN); Baozhang Li, Ningde (CN); Xiao Chen, Ningde (CN); Chang Chuan Shi, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 370 days.

(21) Appl. No.: 16/906,437

(22) Filed: Jun. 19, 2020

(65) Prior Publication Data
US 2021/0202977 A1    Jul. 1, 2021

(30) Foreign Application Priority Data
Dec. 27, 2019 (CN) .......................... 201911378991.6

(51) Int. Cl.
*H01M 10/04*    (2006.01)
*H01M 50/474*    (2021.01)
(Continued)

(52) U.S. Cl.
CPC ...... *H01M 10/0431* (2013.01); *H01M 10/052* (2013.01); *H01M 10/0587* (2013.01);
(Continued)

(58) Field of Classification Search
CPC ........... H01M 50/461; H01M 10/4235; H01M 10/052; H01M 10/0587; H01M 2220/30;
(Continued)

(56) References Cited

U.S. PATENT DOCUMENTS

| 2003/0031925 A1* | 2/2003 | During | H01M 10/052 |
| | | | 429/231.95 |
| 2006/0115736 A1* | 6/2006 | Hashimoto | H01M 50/411 |
| | | | 429/246 |

(Continued)

FOREIGN PATENT DOCUMENTS

| CN | 203218374 U | 9/2013 |
| CN | 110071320 A | 7/2019 |

(Continued)

OTHER PUBLICATIONS

English language machine translation of Jiang Jing, CN110233299(A) (Year: 2019).*

(Continued)

*Primary Examiner* — Jonathan G Jelsma
*Assistant Examiner* — Omar M Kekia
(74) *Attorney, Agent, or Firm* — Ladas & Parry LLP

(57) ABSTRACT

An impact resistant wound cell comprises a first electrode plate with a first surface and a second surface. The first surface comprises a first active material area and a first current collector area, the second surface comprises a second active material area and a second current collector area. The first current collector area is located on an inner side of an outermost circle of the wound cell. In the first electrode plate, the second current collector area and the first current collector area are adjacent to and opposite to each other, the first current collector area and the second current collector area are bonded together by a first bonding member. The present disclosure further provides a battery using the wound cell.

20 Claims, 7 Drawing Sheets

(51) Int. Cl.
  *H01M 50/105* (2021.01)
  *H01M 50/46* (2021.01)
  *H01M 10/052* (2010.01)
  *H01M 10/42* (2006.01)
  *H01M 10/0587* (2010.01)
  *H01M 50/126* (2021.01)

(52) U.S. Cl.
  CPC ...... *H01M 10/4235* (2013.01); *H01M 50/105* (2021.01); *H01M 50/126* (2021.01); *H01M 50/461* (2021.01); *H01M 50/474* (2021.01); *H01M 2220/30* (2013.01); *Y02E 60/10* (2013.01); *Y02P 70/50* (2015.11)

(58) Field of Classification Search
  CPC ............. H01M 50/126; H01M 50/474; H01M 10/0431; H01M 50/105; Y02E 60/10; Y02P 70/50
  USPC ......................................................... 429/94
  See application file for complete search history.

(56) References Cited

U.S. PATENT DOCUMENTS

| | | | |
|---|---|---|---|
| 2011/0064995 A1* | 3/2011 | Kim | H01M 50/186 429/174 |
| 2019/0229361 A1* | 7/2019 | Kim | H01M 50/124 |

FOREIGN PATENT DOCUMENTS

| | | | | |
|---|---|---|---|---|
| CN | 110233299 A | * | 9/2019 | ........ H01M 10/0587 |
| KR | 20040037577 A | | 5/2004 | |

OTHER PUBLICATIONS

First Office action and search report of Chinese application No. 201911378991.6, dated Jan. 26, 2022.

* cited by examiner

WOUND CELL AND BATTERY USING THE SAME

FIELD

The disclosure relates to electrochemical devices, in particular to a wound cell and a battery including the same.

BACKGROUND

Batteries, due to their high energy density, are widely used in portable devices, such as notebooks, mobile phones, unmanned aerial vehicles, and mobile power sources. When a battery is dropped or impacted by an external force, a current collector in an outermost circle of a battery cell inside the battery may be torn or wrinkled, and burrs or sharp corners may occur on the current collector, which will cause a short circuit.

SUMMARY

A wound cell capable of reducing a risk of short circuit and a battery including the wound cell are disclosed.

An embodiment of the present disclosure provides a wound cell including a first electrode plate. The first electrode plate is provided with a first surface and a second surface. The first surface is provided with a first active material area and a first current collector area, and the first current collector area is located on an inner side of an outermost circle of the wound cell. The second surface includes a second active material area and a second current collector area. In the first electrode plate, the second current collector area and the first current collector area are adjacent to and opposite to each other, and the first current collector area and the second current collector area are bonded together by a first bonding member.

In some embodiments, the first current collector area and the second current collector area are directly bonded together by the first bonding member.

In some embodiments, the wound cell further includes a separator located between the first current collector area and the second current collector area. The first current collector area, the separator, and the second current collector area are bonded together by the first bonding member.

In some embodiments, in a winding direction, at least one first bonding member covers at least 50% of a length of each of the first current collector area and the second current collector area.

In some embodiments, the first bonding member completely covers the first current collector area and the second current collector area.

In some embodiments, the first bonding member includes a plurality of portions spaced away from each other on each of the first current collector area and the second current collector area.

In some embodiments, the first bonding member is an adhesive layer or an adhesive tape.

In some embodiments, a length of the wound cell is L3, and a length of the first bonding member in a length direction of the wound cell is $0.5 \times L3 \sim L3$.

In some embodiments, a thickness of the first bonding member is $5 \sim 200$ μm.

The present disclosure further provides a battery including a packaging shell and any one of the above wound cells. The wound cell is arranged in the packaging shell. The second surface further includes a third current collector area connected to the second current collector area. The third current collector area is located on an outer side of the outermost circle of the wound cell. The third current collector area and the packaging shell are bonded together by a second bonding member.

In some embodiments, the second bonding member partially or completely covers the third current collector area.

In some embodiments, the second bonding member is connected to the first bonding member, a length of the wound cell in a winding direction of the wound cell is L1, a total length of the third current collector area and the second current collector area in the winding direction is L2, and a total length of the second bonding member and the first bonding member in the winding direction is $(L1+5) \sim (L2+5)$.

In some embodiments, a length of the wound cell is L3, a length of the second bonding member in a length direction of the wound cell is $0.5 \times L3 \sim L3$, and a thickness of the second bonding member is $5 \sim 200$ μm.

In the wound cell and battery of the present disclosure, the first current collector area and the second current collector area are bonded together by the first bonding member, thus an external force applied on the first current collector area can be passed on to the second current collector area and an interior of the wound cell through the first bonding member. This makes the first electrode plate and a second electrode plate of the wound cell break at the same time, reducing a probability of a short circuit, and improving a safety of the battery.

BRIEF DESCRIPTION OF THE DRAWINGS

Implementations of the present disclosure will now be described, by way of embodiments, with reference to the attached figures.

DETAILED DESCRIPTION

Figure 1:
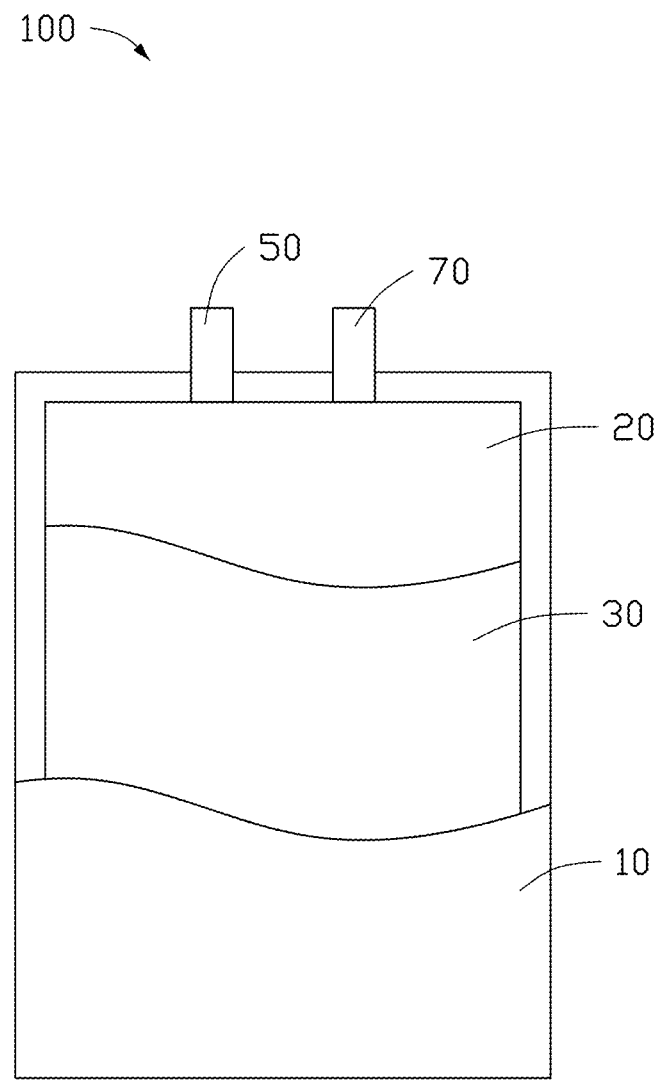
FIG. 1 is a schematic view of an embodiment of a battery.

Implementations of the disclosure will now be described, by way of embodiments only, with reference to the drawing. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are to provide a thorough understanding of the embodiments described herein, but are not to be considered as limiting the scope of the embodiments.

Implementations of the disclosure will now be described, by way of embodiments only, with reference to the drawings. It should be noted that non-conflicting details and features in the embodiments of the present disclosure may be combined with each other.

The "head" is the starting position, along a winding direction W, of the current collector, the active material layer, the separator, the bonding member, or the current collector area. The "tail" is the ending position, along the winding direction W, of the current collector, the active material layer, the separator, or the bonding member.

Figure 2:
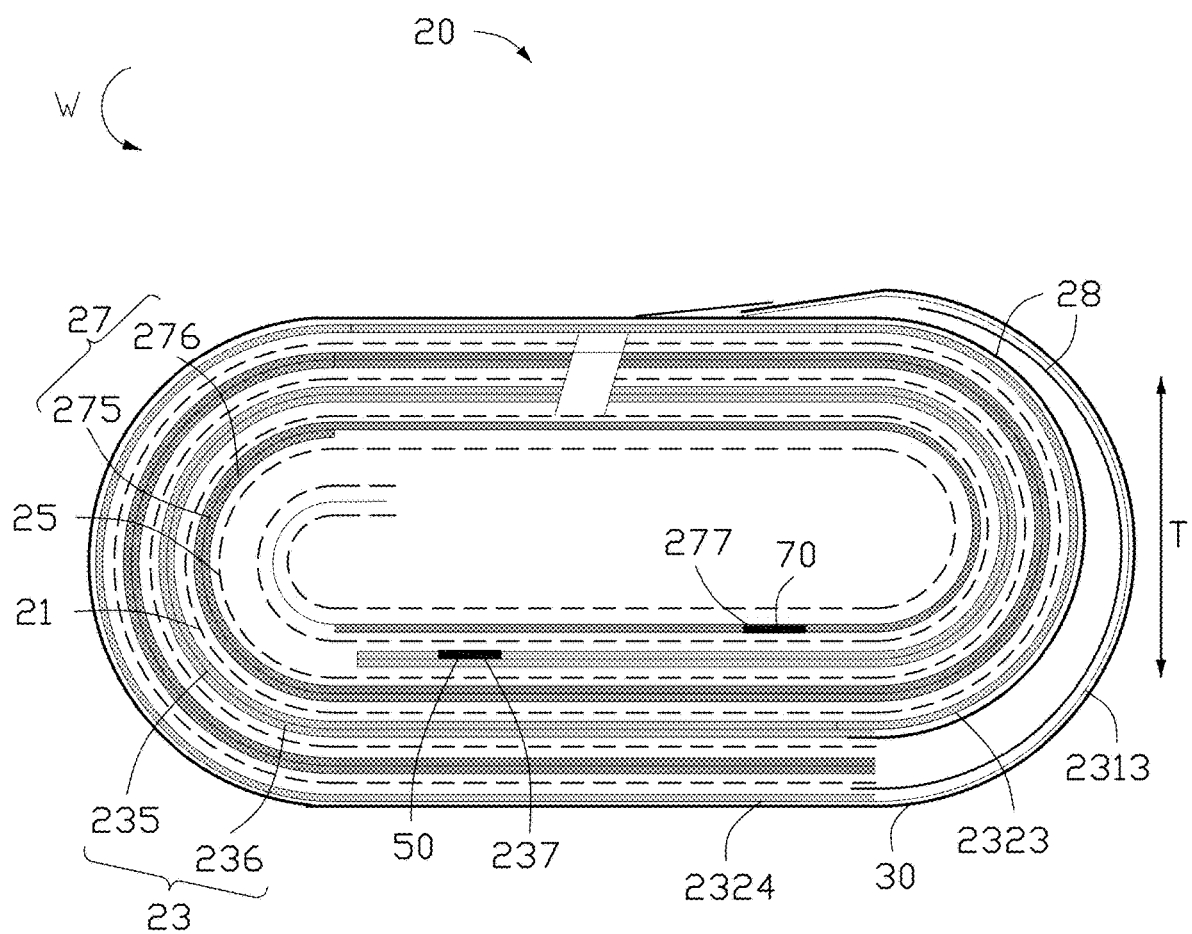
FIG. 2 is a schematic view of a wound cell of the battery of FIG. 1.

Referring to FIGS. 1 and 2, an embodiment of the present disclosure provides a battery 100 including a packaging shell 10, a wound cell 20, and a second bonding member 30. The wound cell 20 is packaged in the packaging shell 10, and adhered to the packaging shell 10 by the second bonding member 30. The wound cell 20 is a flat battery cell in which a first electrode plate 23, a first separator 21, a second electrode plate 27, and a second separator 25 are stacked in that order and wound together. A first electrode tab 50 is connected to the first electrode plate 23, and a second electrode tab 70 is connected to the second electrode plate 27. The first electrode tab 50 and the second electrode tab 70 extend out of the packaging shell 10. In this embodiment, the first electrode plate 23 is a negative electrode plate, the second electrode plate 27 is a positive electrode plate.

The first electrode plate 23 includes a first current collector 235 and a first active material layer 236 coated on opposite surfaces of the first current collector 235. The second electrode plate 27 includes a second current collector 275 and a second active material layer 276 coated on opposite surfaces of the second current collector 275. The first active material layer 236 defines a first groove 237 in which the first current collector 235 is exposed. The first electrode tab 50 is received in the first groove 237, electrically connected to the first current collector 235, and configured to conduct electrons of the first current collector 235. The second active material layer 276 defines a second groove 277 in which the second current collector 275 is exposed. The second electrode tab 70 is received in the second groove 277, electrically connected to the second current collector 275, and configured to conduct electrons of the second current collector 275. In a thickness direction T of the wound cell 20, the first electrode tab 50 is not aligned with the second electrode tab 70, reducing a thickness of the wound cell 20.

Figure 3:
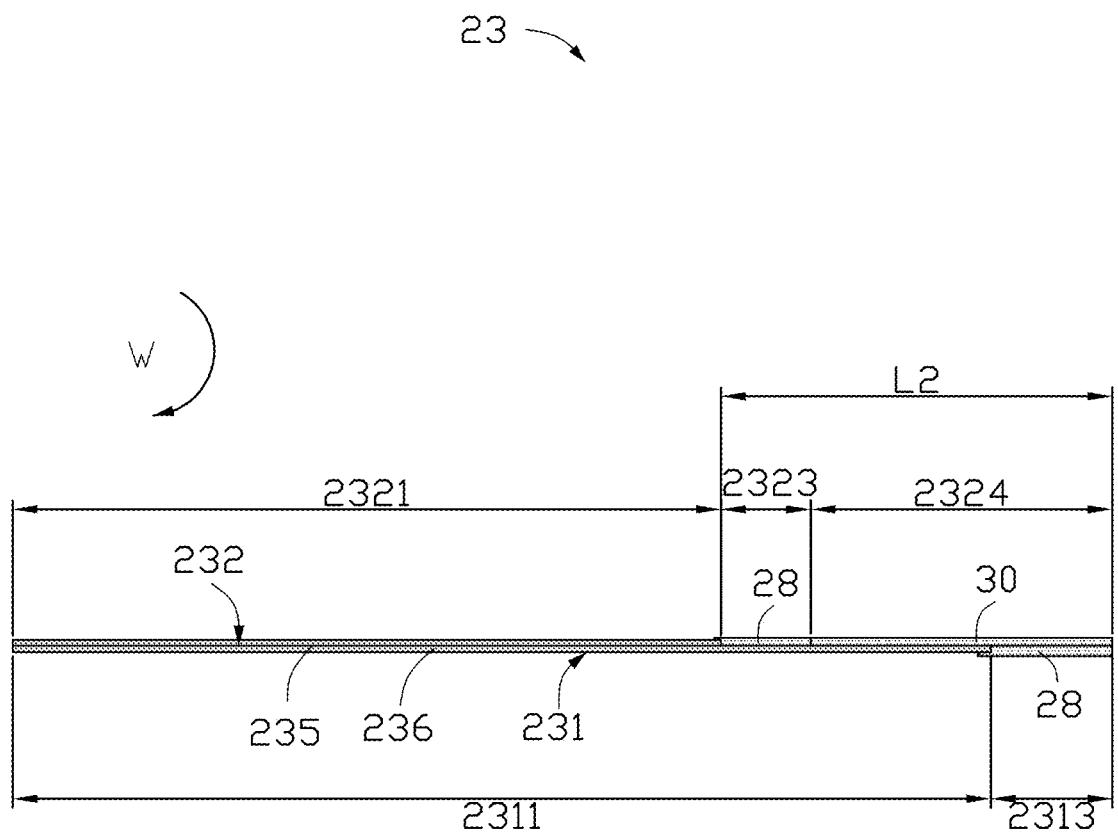
FIG. 3 is a developed view of a first electrode plate with bonding members in the wound cell of FIG. 2.

Referring to FIG. 3, the first electrode plate 23 includes a first surface 231 and an opposing second surface 232. The first surface 231 is provided with a first active material area 2311 and a first current collector area 2313 connected to each other. The first active material area 2311 includes a portion of the first current collector 235 and the first active material layer 236 arranged on a first surface of the portion of the first current collector 235. The first current collector area 2313 only includes the remaining first current collector 235 where the first active material layer 236 is not coated on a first surface of the first current collector 235. The second surface 232 is provided with a second active material area 2321, a second current collector area 2323, and a third current collector area 2324 connected in that order. The second active material area 2321 includes a portion of the first current collector 235 and the first active material layer 236 arranged on a second surface of the portion of the first current collector 235. Each of the second current collector area 2323 and the third current collector area 2324 only includes the remaining first current collector 235 where the first active material layer 236 is not coated on a second surface of the first current collector 235.

Referring to FIG. 2, along a winding direction W, the first current collector area 2313 is located on an inner side of an outermost circle of the wound cell 20, and the second current collector area 2323 is located on an outer side of a second outermost circle of the wound cell 20. The third current collector area 2324 is located on an outer side of the outermost circle of the wound cell 20. The outermost circle of the wound cell 20 refers to a layered structure, located on the outermost side with respect to the center of the wound cell 20, of a multi-layer structure formed by winding a stack which comprises the first electrode plate 23, the first separator 21, the second electrode plate 27, and the second separator 25, in a clockwise or counterclockwise direction. The outermost circle of the wound cell 20 can be the first electrode plate 23 or the second electrode plate 27. The inner side of the outermost circle of the wound cell 20 refers to a side of the outermost circle facing the center of the wound cell 20. The second outermost circle of the wound cell 20 refers to a layered structure, located on the second outermost side with respect to the center of the wound cell 20, of a multi-layer structure formed by winding the stack which comprises the first electrode plate 23, the first separator 21, the second electrode plate 27, and the second separator 25, in a clockwise or counterclockwise direction. The second outermost circle of the wound cell 20 can be the first electrode plate 23, the first separator 21, the second electrode plate 27, or the second separator 25. The outer side of the second outermost circle of the wound cell 20 refers to a side of the second outermost circle facing away from the center of the wound cell 20. Along the winding direction W, the first current collector area 2313 and the second current collector area 2323 are arranged to be adjacent to and opposite to each other, and bonded together by the second bonding member 30.

In this embodiment, the first current collector area 2313 and the second current collector area 2323 are directly bonded together by a first bonding member 28. Furthermore, the first separator 21 and the second separator 25 may be also arranged between the first current collector area 2313 and the second current collector area 2323, the first current collector area 2313 is adhered to the first separator 21 by one first bonding member 28, the first separator 21 and the second separator 25 are bonded together by one first bonding member 28, and the second separator 25 is adhered to the second current collector area 2323 by one first bonding member 28. When an external force is applied on the first current collector 235 in the first current collector area 2313, the force is transmitted to the first current collector 235 in the second current collector area 2323 through the first bonding member 28, and passed on to the inside of the wound cell 20, which makes the first electrode plate 23 and the second electrode plate 27 of the wound cell 20 break at the same time without generating burrs or sharp corners. The first electrode plate 23 is separated from the second electrode plate 27, thereby reducing a probability of a short circuit, and improving a safety of the battery 100.

The first bonding member 28 partially or completely covers an area between the first current collector area 2313 and the second current collector area 2323. Optionally, the first bonding member 28 covers at least 50% of a length of each of the first current collector area 2313 and the second current collector area 2323 along the winding direction W. Optionally, a tail of the first current collector area 2313 is adhered to the second current collector area 2323 by the first bonding member 28, avoiding a separation of the tail of the first current collector area 2313 and the second current collector area 2323, thereby ensuring that the force applied on the first current collector area 2313 can be continuously transmitted from the outside to the inside of the wound cell 20.

The second bonding member 30 partially or completely covers the third current collector area 2324. Alternatively, a head of the second bonding member 30 is connected to a tail of the first bonding member 28. Alternatively, a tail of the second bonding member 30 extends outside of a tail of the first current collector 235, and is adhered to an area between the head and tail of the second bonding member 30 or to an area between a head and tail of the third current collector area 2324. Thereby a portion of the first current collector 235 located on the outermost circle and a portion of the first current collector 235 located on the second outermost circle are further fixed together.

FIGS. 1 and 2 illustrate that, in the battery 100 of the present disclosure, the third current collector area 2324 of the wound cell 20 is adhered to an inner wall of the packaging shell 10. The first current collector area 2313 and the second current collector area 2323 of the wound cell 20 are bonded together by the first bonding member 28. Therefore when an external force is applied on the battery 100, the force is transmitted to the wound cell 20 through the second bonding member 30, and then transmitted to the inside of the wound cell 20 through the first bonding member 28, which makes the first electrode plate 23 and the second electrode plate 27 of the wound cell 20 break at the same time without generating burrs or sharp corners. The first electrode plate 23 is separated from the second electrode plate 27, thereby reducing a probability of a short circuit, and improving a safety of the battery 100.

Each of the first bonding member 28 and the second bonding member 30 is an adhesive layer or an adhesive tape. The adhesive of the adhesive layer or the adhesive tape is a pressure sensitive adhesive or a hot melt adhesive. The hot melt adhesive is selected from a group consisting of polyolefin hot melt adhesive, polyurethane hot melt adhesive, ethylene and copolymer hot melt adhesive, polyester hot melt adhesive, polyamide hot melt adhesive, styrene and its blocks copolymer hot melt adhesive, and any combination thereof. When preparing the wound cell 20, an adhesive is coated or pasted on the first surface 231 of the first electrode plate 23 and then wound to form the first bonding member 28, or an adhesive can be coated or pasted on the first surface 231 and the second surface 232 and then wound to form the first bonding member 28. A thickness of each of the first bonding member 28 and the second bonding member 30 is 5~200 μm.

In the winding direction W of the wound cell 20, a tail of the first separator 21, a tail of the second separator 25, a tail of the second active material layer 276, and a tail of the second current collector 275 are flush with each other. In this embodiment, in the winding direction W of the wound cell 20, each of a tail of the first active material layer 236 in the first active material area 2311 and a tail of the first active material layer 236 in the second active material area 2321 is flush with the tail of the second active material layer 276. The first bonding member 28 is connected to the first active material area 2311 and the second active material area 2321. A head of the first bonding member 28 extends to the first active material layer 236 and partially covers the first active material layer 236 to insulate the first electrode plate 23 and the second electrode plate 27.

Figure 4:
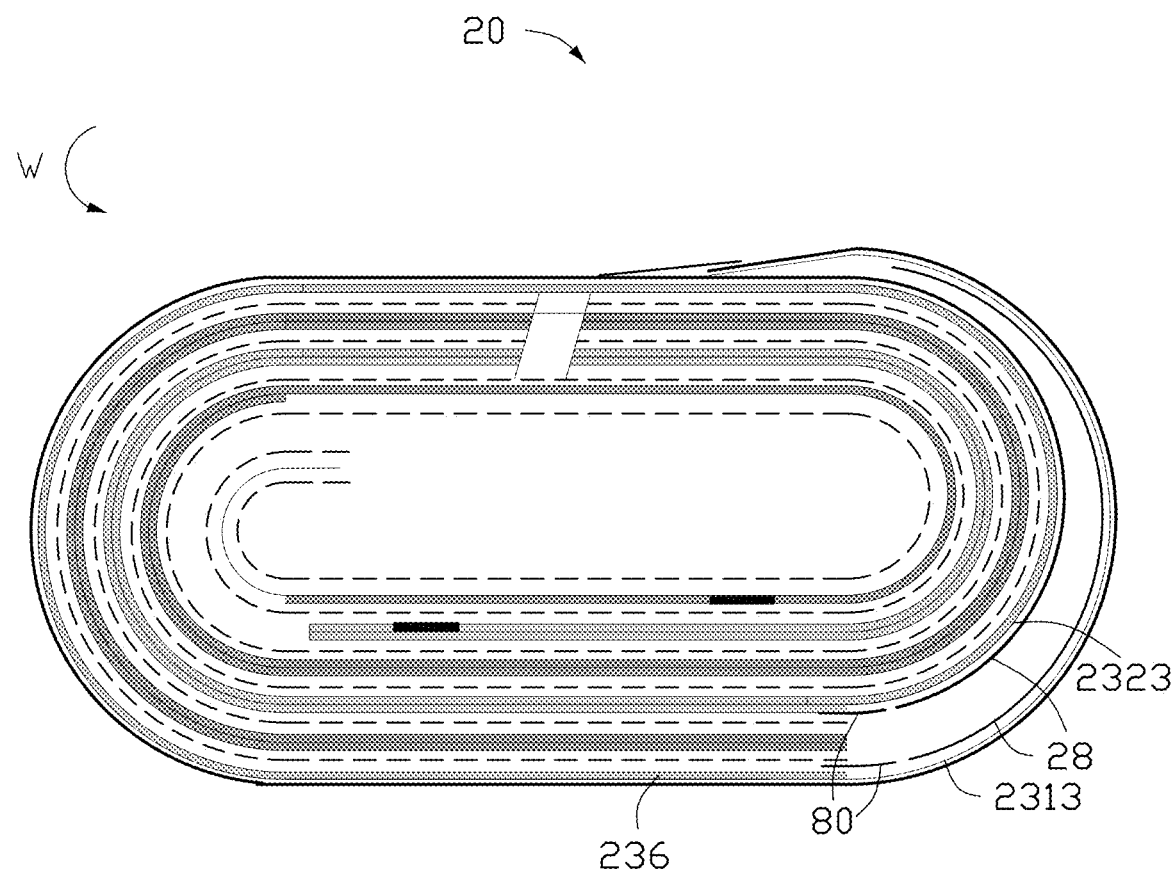
FIG. 4 is a schematic view of a wound cell in another embodiment.

Referring to FIG. 4, alternatively, an insulating layer 80 is coated or pasted on an area of the first active material layer 236 adjacent to the tail thereof, and extended to the first current collector area 2313 and the second current collector area 2323. The head of the first bonding member 28 is adjacent to an edge of an end of the insulating layer 80 away from the first active material layer 236, and the first bonding member 28 is not combined with the insulating layer 80. Alternatively, the first bonding member 28 can also be coated or pasted on a portion of the insulating layer 80 on the first active material layer 236, partially or completely covering the insulating layer 80.

Figure 5:
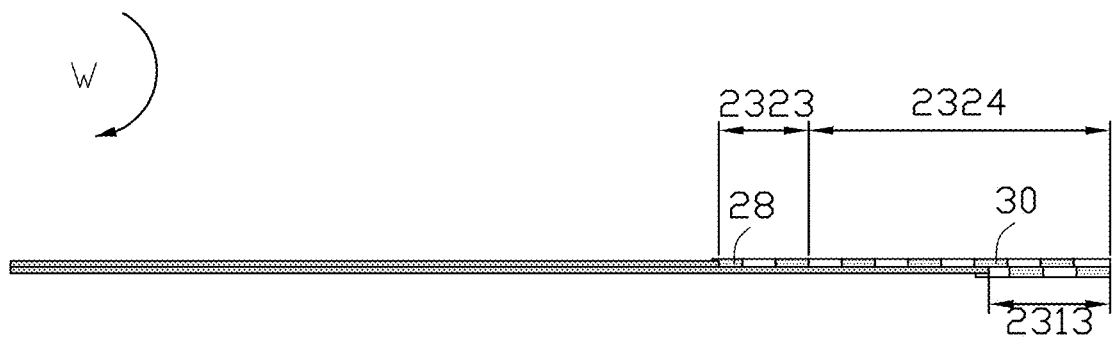
FIG. 5 is a developed perspective view a first electrode plate with bonding members in another embodiment.

Referring to FIG. 5, alternatively, along the winding direction W, the first bonding member 28 includes a plurality of portions which are spaced from each other on each of the first current collector area 2313 and the second current collector area 2323. Alternatively, along the winding direction W, the second bonding members 30 can be spaced from each other on the third current collector area 2324.

Figure 6:
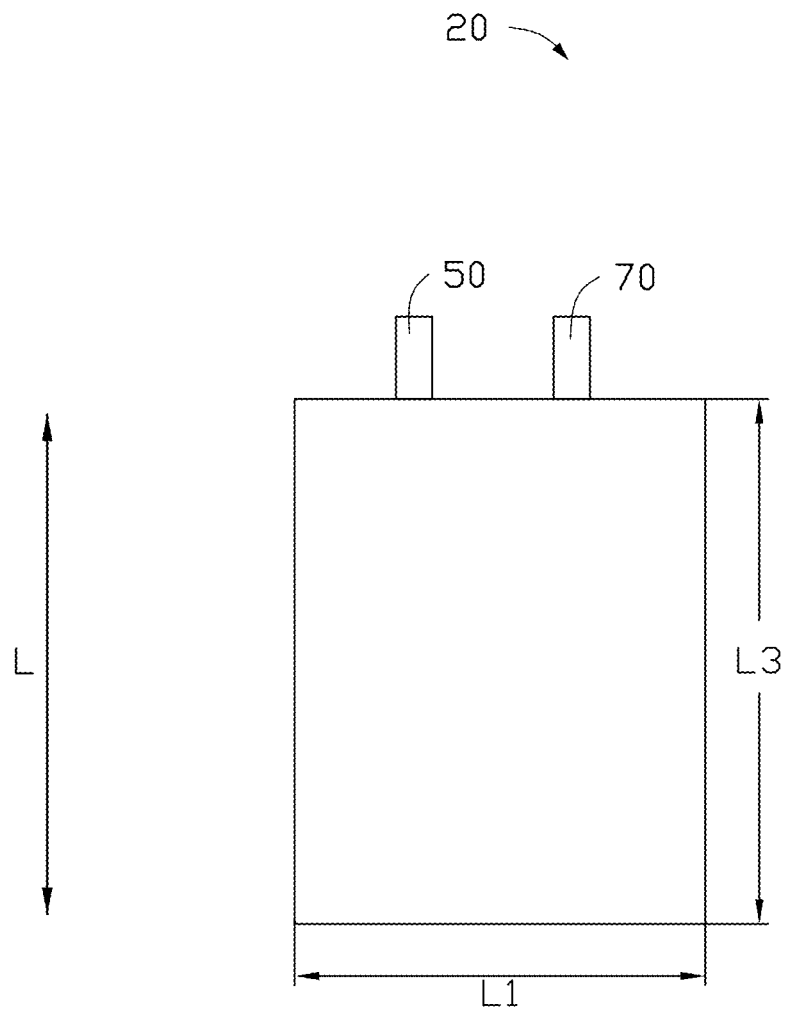
FIG. 6 is a top view of the wound cell of FIG. 1.

Referring to FIGS. 3 and 6, in a length direction L of the wound cell 20, a length of the wound cell 20 is L3 mm, a length of the first bonding member 28 is 0.5L3~L3 mm, and a length of the second bonding member 30 is 0.5L3~L3 mm. Where, the length direction L is parallel to an extending direction of electrode tab. A length of the wound cell 20 along the winding direction W is L1 mm, a total length of the second current collector area 2323 and the third current collector area 2324 along the winding direction W is L2 mm, and a total length of the second bonding member 30 and the first bonding member 28 along the winding direction is (L1+5)~(L2+5) mm.

Figure 7:
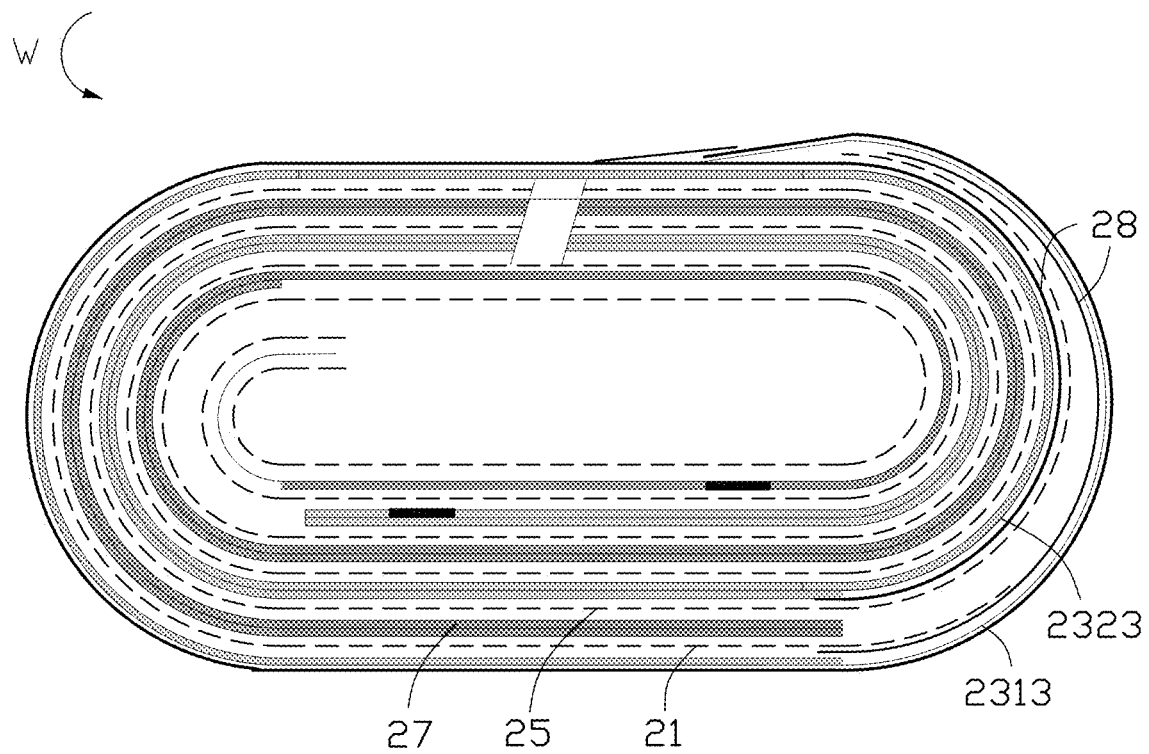
FIG. 7 is a schematic view of a wound cell in yet another embodiment.

Referring to FIG. 7, alternatively, in the winding direction W, at least one of the tails of the first separator 21 and the second separator 25 exceeds a tail of the second electrode plate 27, that is at least one of a part of the first separator 21 and a part of the second separator 25 is located between the first current collector area 2313 and the second current collector area 2323. The first current collector area 2313, the part of the separator located between the first current collector area 2313 and the second current collector area 2323, and the second current collector area 2323 are bonded together by the first bonding member 28. The first bonding member 28 includes a first portion located between the first current collector area 2313 and the separator, and a second portion located between the second current collector area 2323 and the separator. When separating the wound cell 20, an adhesive is coated or pasted on the first surface 231 and the second surface 232 and then wound to form the first bonding member 28.

The present disclosure is illustrated by way of different embodiments and comparative embodiments.

Example 1

The wound cell 20 shown in FIG. 2 was used to prepare twenty groups of batteries, finished after being filled with electrolyte, encapsulated, and formatted. The head of the second bonding member 30 was connected to the tail of the first bonding member 28, the first bonding member 28 completely covered the first current collector area 2313 and the second current collector area 2323, and the second bonding member 30 completely covered the third current collector area 2324. The head of the first bonding member 28 was arranged on the first active material layer 236. In the winding direction W, a length of a portion of the first bonding member 28 on the first active material layer 236 was 5 mm, a total length of the first bonding member 28 and the second bonding member 30 was L2+5. A length of each of the first bonding member 28 and the second bonding member 30 in the length direction L of the wound cell 20 was L3. The adhesive of each of the first bonding member 28 and the second bonding member 30 was a hot melt adhesive.

Example 2

The wound cell 20 shown in FIG. 4 was used to prepare twenty groups of finished batteries. The head of the first bonding member 28 was connected to the tail of the insulating layer 80, the head of the second bonding member 30 was connected to the tail of the first bonding member 28. The first bonding member 28 completely covered the first current collector area 2313 and the second current collector area 2323, and the second bonding member 30 completely covered the third current collector area 2324. The head of the first bonding member 28 was arranged on the first active material layer 236. In the winding direction W, a length of a portion of the insulating layer 80 on the first active material layer 236 was 2 mm, a length of the insulating layer 80 is 10 mm, and a total length of the first bonding member 28 and the second bonding member 30 was L2 −8. A length of each of the first bonding member 28 and the second bonding member 30 in the length direction L of the wound cell 20 was L3. The adhesive of each of the first bonding member 28 and the second bonding member 30 was a hot melt adhesive.

Example 3

The wound cell 20 shown in FIG. 2 was used to prepare twenty groups of finished batteries. The head of the second bonding member 30 was connected to the tail of the first bonding member 28, the first bonding member 28 partially covered the first current collector area 2313 and the second current collector area 2323, and the second bonding member 30 completely covered the third current collector area 2324. The head of the first bonding member 28 was arranged on the first active material layer 236. In the winding direction W, a length of a portion of the first bonding member 28 on the first active material layer 236 was 2 mm, and a total length of the first bonding member 28 and the second bonding member 30 was L1+5. A length of each of the first bonding member 28 and the second bonding member 30 in the length direction L of the wound cell 20 was L3. The adhesive of each of the first bonding member 28 and the second bonding member 30 was a hot melt adhesive.

Example 4

The wound cell 20 shown in FIG. 2 was used to prepare twenty groups of finished batteries. The head of the second bonding member 30 was connected to the tail of the first bonding member 28, the first bonding member 28 completely covered the first current collector area 2313 and the second current collector area 2323, and the second bonding member 30 completely covered the third current collector area 2324. The head of the first bonding member 28 was arranged on the first active material layer 236. In the winding direction W, a length of a portion of the first bonding member 28 on the first active material layer 236 was 5 mm, and a total length of the first bonding member 28 and the second bonding member 30 was L2+5. A length of each of the first bonding member 28 and the second bonding member 30 in the length direction L of the wound cell 20 was 50%×L3. The adhesive of each of the first bonding member 28 and the second bonding member 30 was a hot melt adhesive.

Example 5

The wound cell 20 shown in FIG. 2 was used to prepare twenty groups of finished batteries. The head of the second bonding member 30 was connected to the tail of the first bonding member 28, the first bonding member 28 completely covered the first current collector area 2313 and the second current collector area 2323, and the second bonding member 30 completely covered the third current collector area 2324. The head of the first bonding member 28 was arranged on the first active material layer 236. In the winding direction W, a length of a portion of the first bonding member 28 on the first active material layer 236 was 5 mm, and a total length of the first bonding member 28 and the second bonding member 30 was L2+5. A length of each of the first bonding member 28 and the second bonding member 30 in the length direction L of the wound cell 20 was 80%×L3. The adhesive of each of the first bonding member 28 and the second bonding member 30 was a hot melt adhesive.

Example 6

A finished battery was prepared that was substantially the same as the finished battery of embodiment 1 except that the adhesive of each of the first bonding member 28 and the second bonding member 30 was a pressure sensitive adhesive.

Example 7

A finished battery was prepared that was substantially the same as the finished battery of embodiment 2 except that the adhesive of each of the first bonding member 28 and the second bonding member 30 was a pressure sensitive adhesive.

Example 8

A finished battery was prepared that was substantially the same as the finished battery of embodiment 3 except that the adhesive of each of the first bonding member 28 and the second bonding member 30 was a pressure sensitive adhesive.

Example 9

A finished battery was prepared that was substantially the same as the finished battery of embodiment 4 except that the adhesive of each of the first bonding member 28 and the second bonding member 30 was a pressure sensitive adhesive.

Example 10

A finished battery was prepared that was substantially the same as the finished battery of embodiment 5 except that the adhesive of each of the first bonding member 28 and the second bonding member 30 was a pressure sensitive adhesive.

Comparative Example 1

A finished battery was prepared by a wound cell that was substantially the same as the wound cell 20 shown in FIG. 2 except that the first current collector area 2313 and the second current collector area 2323 were not bonded together by the first bonding member 28. The third current collector area 2324 and the packaging shell 10 were also not bonded together by the second bonding member 30.

Comparative Example 2

A finished battery was prepared by a wound cell that was substantially the same as the wound cell 20 shown in FIG.

2 except that the first current collector area 2313 and the second current collector area 2323 were not bonded together by the first bonding member 28. The length of the second bonding member 30 in the winding direction W was 2L1, and length of the second bonding member 30 in the length direction L was L3.

Comparative Example 3

A finished battery was prepared that was substantially the same as the finished battery of embodiment 1 except that a length of each of the first bonding member 28 and the second bonding member 30 in the length direction L of the wound cell 20 was 20%×L3.

Impact test was performed on the finished batteries provided in examples 1 to 10 and comparative examples 1 to 3, the test conditions and results are shown in Table 1. The impact testing method was placing a metal rod with a diameter of 15.8 mm±0.2 mm horizontally at the center of a surface of the battery, and dropping a heavy object with a weight of 9.1 kg±0.1 kg from a height of 610 mm±25 mm to hit the metal rod. If the tested battery did not catch fire or explode, it passed the test.

TABLE 1

| | Adhesive of each of the first and second bonding member | Total length of first and second bonding members in the winding direction | Length of each of the first and second bonding members in the length direction | Pass rate of impact test |
|---|---|---|---|---|
| Example 1 | hot melt adhesive | L2 + 5 | L3 | 20/20 |
| Example 2 | hot melt adhesive | L2 − 8 | L3 | 19/20 |
| Example 3 | hot melt adhesive | L1 + 5 | L3 | 16/20 |
| Example 4 | hot melt adhesive | L2 + 5 | 50%*L3 | 18/20 |
| Example 5 | hot melt adhesive | L2 + 5 | 80%*L3 | 20/20 |
| Example 6 | pressure sensitive adhesive | L2 + 5 | L3 | 20/20 |
| Example 7 | pressure sensitive adhesive | L2 − 8 | L3 | 19/20 |
| Example 8 | pressure sensitive adhesive | L1 + 5 | L3 | 16/20 |
| Example 9 | pressure sensitive adhesive | L2 + 5 | 50%*L3 | 18/20 |
| Example 10 | pressure sensitive adhesive | L2 + 5 | 80%*L3 | 20/20 |
| Comparative Example 1 | — | — | — | 0/20 |
| Comparative Example 2 | hot melt adhesive | 2L1 | L3 | 15/20 |
| Comparative Example 3 | hot melt adhesive | L2 + 5 | 20%*L3 | 10/20 |

Table 1 shows a high pass rate in impact testing of the batteries prepared in the present disclosure. With the decrease of the total length of the first and second bonding members in the winding direction and/or the decrease of the length of each of the first and second bonding members in the length direction, the pass rate in impact testing is increased. Furthermore, by bonding the first current collector area 2313 and the second current collector area 2323 via the first bonding member 28, the pass rate in impact testing can be improved.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:
1. A wound cell comprising:
a first electrode plate, a first separator, a second electrode plate and a second separator that are stacked in that order and wound together;
wherein the first electrode plate comprises a first current collector and a first active material partially coated on both surfaces of the first current collector;
wherein a first surface of the first electrode plate is provided with a first active material area coated with the first active material and a first current collector area without coating of the first active material, and the first current collector area being located on an inner side of an outermost layer of the wound cell;
wherein a second surface of the first electrode plate is provided with a second active material area coated with the first active material and a second current collector area without coating of the first active material; and
wherein, when the first electrode plate is wound, the second current collector area and the first current collector area are adjacent to and opposite to each other, and the first current collector area and the second current collector area are bonded together by a first bonding member.

2. The wound cell of claim 1, wherein the first current collector area and the second current collector area are directly bonded together by the first bonding member.

3. The wound cell of claim 1, wherein when the first electrode plate is wound, the first current collector area and the second current collector area are separated by the first separator and/or the second separator, and the first current collector area, the second current collector area and the separator(s) are bonded together by the first bonding member.

4. The wound cell of claim 1, wherein in a winding direction of the wound cell, the first bonding member covers at least 50% of a length of each of the first current collector area and the second current collector area.

5. The wound cell of claim 1, wherein the first bonding member completely covers the first current collector area and the second current collector area.

6. The wound cell of claim 1, wherein the first bonding member comprises a plurality of portions spaced away from each other on each of the first current collector area and the second current collector area.

7. The wound cell of claim 1, wherein the first bonding member is coupled to the first active material area.

8. The wound cell of claim 1, wherein the first bonding member is an adhesive layer or an adhesive tape.

9. The wound cell of claim 1, wherein a length of the wound cell is L3, and a length of the first bonding member in a length direction of the wound cell is 0.5×L3 to L3.

10. The wound cell of claim 1, wherein a thickness of the first bonding member is 5 μm to 200 μm.

11. A battery comprising:
a packaging shell; and
a wound cell arranged in the packaging shell and comprising a first electrode plate, a first separator, a second electrode plate and a second separator that are stacked in that order and wound together;
wherein the first electrode plate comprises a first current collector and a first active material partially coated on both surfaces of the first current collector;
wherein a first surface of the first electrode plate is provided with a first active material area coated with the first active material and a first current collector area without coating of the first active material, and the first current collector area being located on an inner side of an outermost layer of the wound cell;

wherein a second surface of the first electrode plate is provided with a second active material area coated with the first active material, a second current collector area without coating of the first active material, and a third current collector area connected to the first current collector area, the third current collector area being located on an outer side of the outermost layer of the wound cell; and wherein, when the first electrode plate is wound, the second current collector area and the first current collector area are adjacent to and opposite to each other, the first current collector area and the second current collector area are bonded together by a first bonding member, and the third current collector area and the packaging shell are bonded together by a second bonding member.

12. The battery of claim 11, wherein the second bonding member partially or completely covers the third current collector area.

13. The battery of claim 11, wherein the second bonding member is connected to the first bonding member, a length of the wound cell in a winding direction of the wound cell is L1, a total length of the third current collector area and the second current collector area in the winding direction is L2, a total length of the second bonding member and the first bonding member in the winding direction is (L1+5) to (L2+5).

14. The battery of claim 11, wherein a length of the wound cell is L3, a length of the second bonding member in a length direction of the wound cell is 0.5×L3 to L3, a thickness of the second bonding member is 5 µm to 200 µm.

15. The battery of claim 11, wherein the first current collector area and the second current collector area are directly bonded together by the first bonding member.

16. The battery of claim 11, wherein when the first electrode plate is wound, the first current collector area and the second current collector area are separated by the first separator and/or the second separator, and the first current collector area, the separator(s), and the second current collector area are bonded together by the first bonding member.

17. The battery of claim 11, wherein in a winding direction of the wound cell, the first bonding member covers at least 50% of a length of each of the first current collector area and the second current collector area.

18. The battery of claim 11, wherein the first bonding member completely covers the first current collector area and the second current collector area.

19. The battery of claim 11, wherein the first bonding member comprises a plurality of portions spaced away from each other on each of the first current collector area and the second current collector area.

20. The battery of claim 11, wherein the first bonding member is coupled to the first active material area.

* * * * *